US010692271B1

(12) United States Patent
Saleh

(10) Patent No.: US 10,692,271 B1
(45) Date of Patent: Jun. 23, 2020

(54) ROBUST RAY-TRIANGLE INTERSECTION

(71) Applicant: Advanced Micro Devices, Inc., Santa Clara, CA (US)

(72) Inventor: Skyler Jonathon Saleh, La Jolla, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1 day.

(21) Appl. No.: 16/219,809

(22) Filed: Dec. 13, 2018

(51) Int. Cl.
 *G06T 15/06* (2011.01)
 *G06T 15/00* (2011.01)
 *G06K 9/62* (2006.01)
(52) U.S. Cl.
 CPC ............ *G06T 15/06* (2013.01); *G06K 9/6267* (2013.01); *G06T 15/005* (2013.01)
(58) Field of Classification Search
 None
 See application file for complete search history.

(56) References Cited

U.S. PATENT DOCUMENTS

| | | | | | |
|---|---|---|---|---|---|
| 5,446,836 | A | * | 8/1995 | Lentz | ...................... G06T 11/40 345/441 |
| 2017/0293995 | A1 | * | 10/2017 | Saleh | ........................ G06T 1/20 |
| 2018/0276874 | A1 | * | 9/2018 | Myhill | ..................... A63F 13/25 |
| 2019/0088002 | A1 | * | 3/2019 | Howson | .................. G06T 15/06 |
| 2019/0318526 | A1 | * | 10/2019 | Hunt | ...................... G06T 19/006 |

OTHER PUBLICATIONS

Stich, M., "Introduction to NVIDIA RTX and DirectX Ray Tracing," NVIDIA Developer Blog, https://devblogs.nvidia.com/introduction-nvidia-rtx-directx-ray-tracing/, Mar. 19, 2018 (Retrieved Dec. 13, 2018).
Owen, G. Scott, "Ray—Box Intersection", https://www.siggraph.org//education/materials/HyperGraph/raytrace/rtinter3.htm, Apr. 1, 1998 (Retrieved Dec. 13, 2018).

* cited by examiner

*Primary Examiner* — Peter Hoang
(74) *Attorney, Agent, or Firm* — Volpe and Koenig, P.C.

(57) ABSTRACT

A technique for classifying a ray tracing intersection with a triangle edge or vertex avoids either rendering holes or multiple hits of the same ray for different triangles. The technique employs a tie-breaking scheme in which certain types of edges are classified as hits and certain types of edges are classified as misses. The test is performed in a coordinate space that comprises a projection into the viewspace of the ray, and thus where the ray direction has a non-zero magnitude in one axis (e.g., z) but a zero magnitude in the two other axes. In this coordinate space, edges are classified as one of top, bottom, left, and right, and an intersection on an edge counts as a hit if the intersection hits a top or left edge, but a miss if the intersection hits a bottom or right edge. Vertices are processed in a related manner.

20 Claims, 7 Drawing Sheets

ROBUST RAY-TRIANGLE INTERSECTION

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein is a technique for classifying a ray tracing intersection with a triangle edge or vertex that avoids either rendering holes or multiple hits of the same ray for different triangles. The technique employs a tie-breaking scheme in which intersections of the ray with certain types of edges are classified as hits and intersections of the ray with certain other types of edges are classified as misses. The ray triangle intersection test is performed in a coordinate space that comprises a projection into the viewsp ace of the ray, and thus where the ray direction has a non-zero magnitude in one axis (e.g., z) but a zero magnitude in the two other axes. In this coordinate space, edges are classified as one of top, bottom, left, and right, and an intersection on an edge counts as a hit if the intersection hits a top or left edge, but a miss if the intersection hits a bottom or right edge. Vertices are processed in a related manner. Additional details are provided below.

Figure 1:
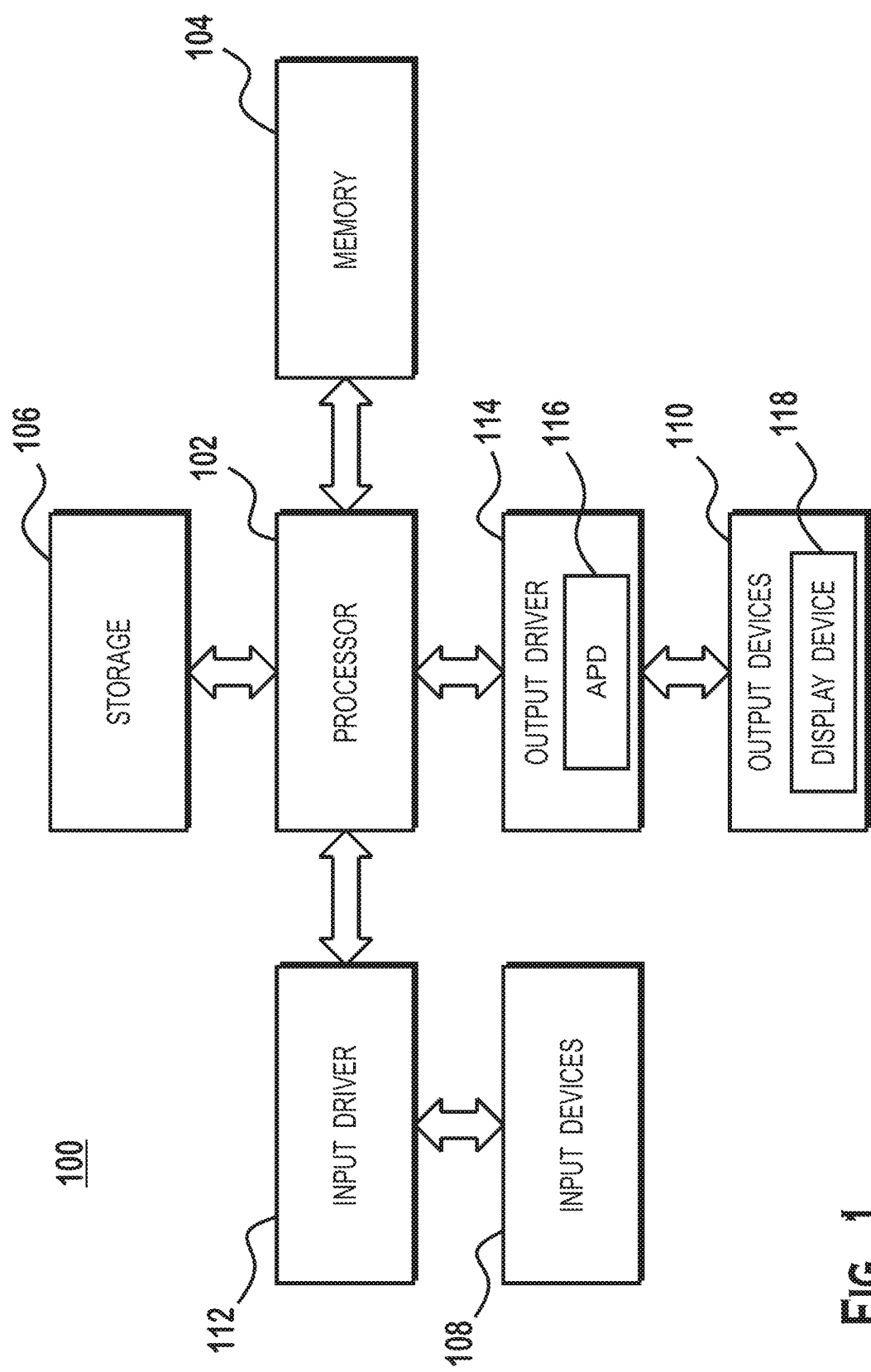
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
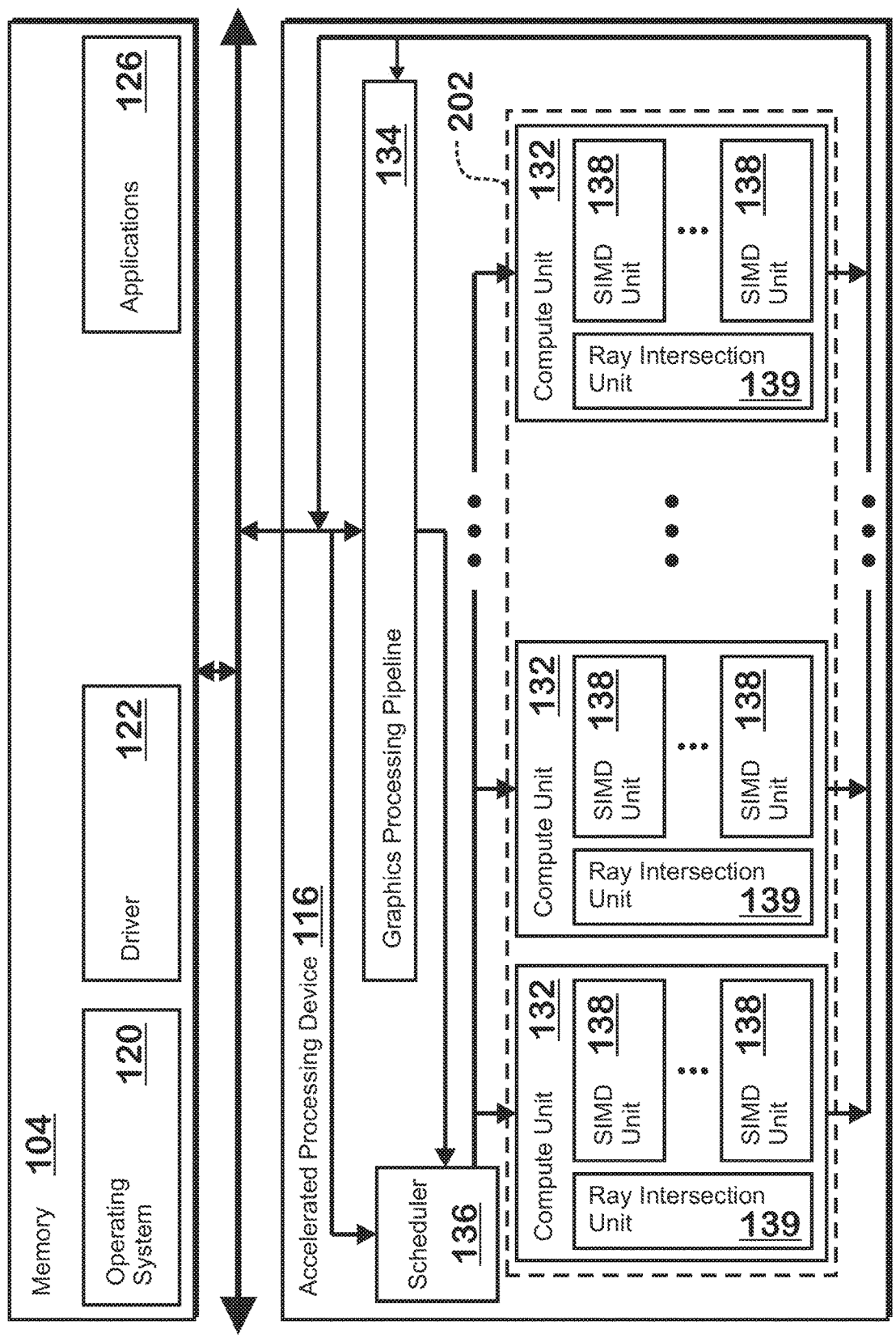
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below. Each compute unit 132 also includes a fixed function hardware accelerator for performing a test to determine whether rays intersect triangles, which is the ray intersection unit 139.

Figure 3:
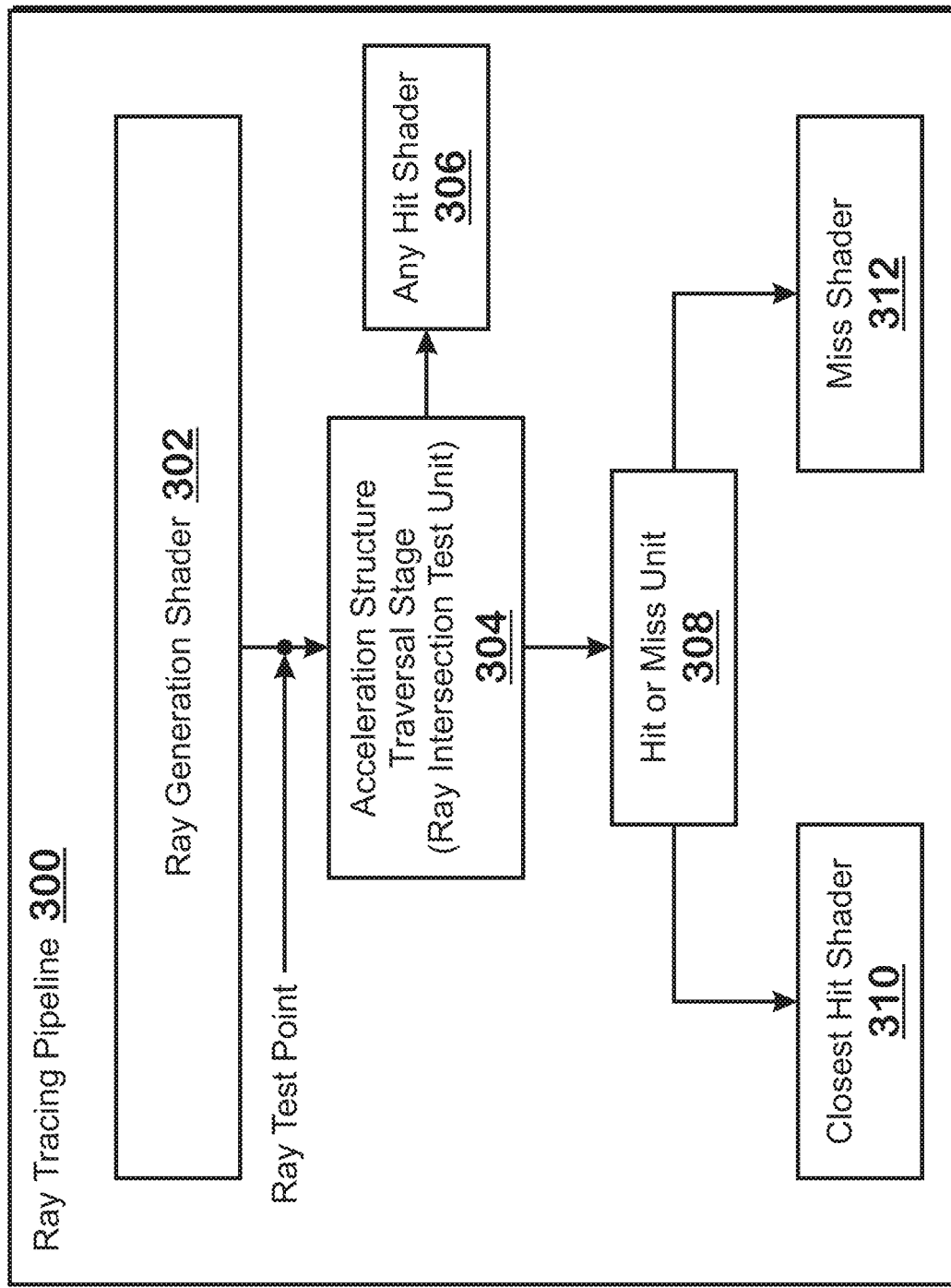
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122. The acceleration structure traversal stage 304 performs the ray intersection test to determine whether a ray hits a triangle. The operations of the acceleration structure traversal stage are performed by the ray intersection test unit 139. The various programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware (e.g., in the ray intersection unit 139), or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit.

The ray tracing pipeline 300 operates in the following manner. A ray generation shader 302 is executed. The ray generation shader 302 sets up data for a ray to test against a triangle and requests the ray intersection test unit 139 test the ray for intersection with triangles.

The ray intersection test unit 139 traverses an acceleration structure at the acceleration structure traversal stage 304, which is a data structure that describes a scene volume and objects within the scene, and tests the ray against triangles in the scene. The hit or miss unit 308, which may be part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader. Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 139 reports as being hit is fully transparent. Because the ray intersection test unit 139 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
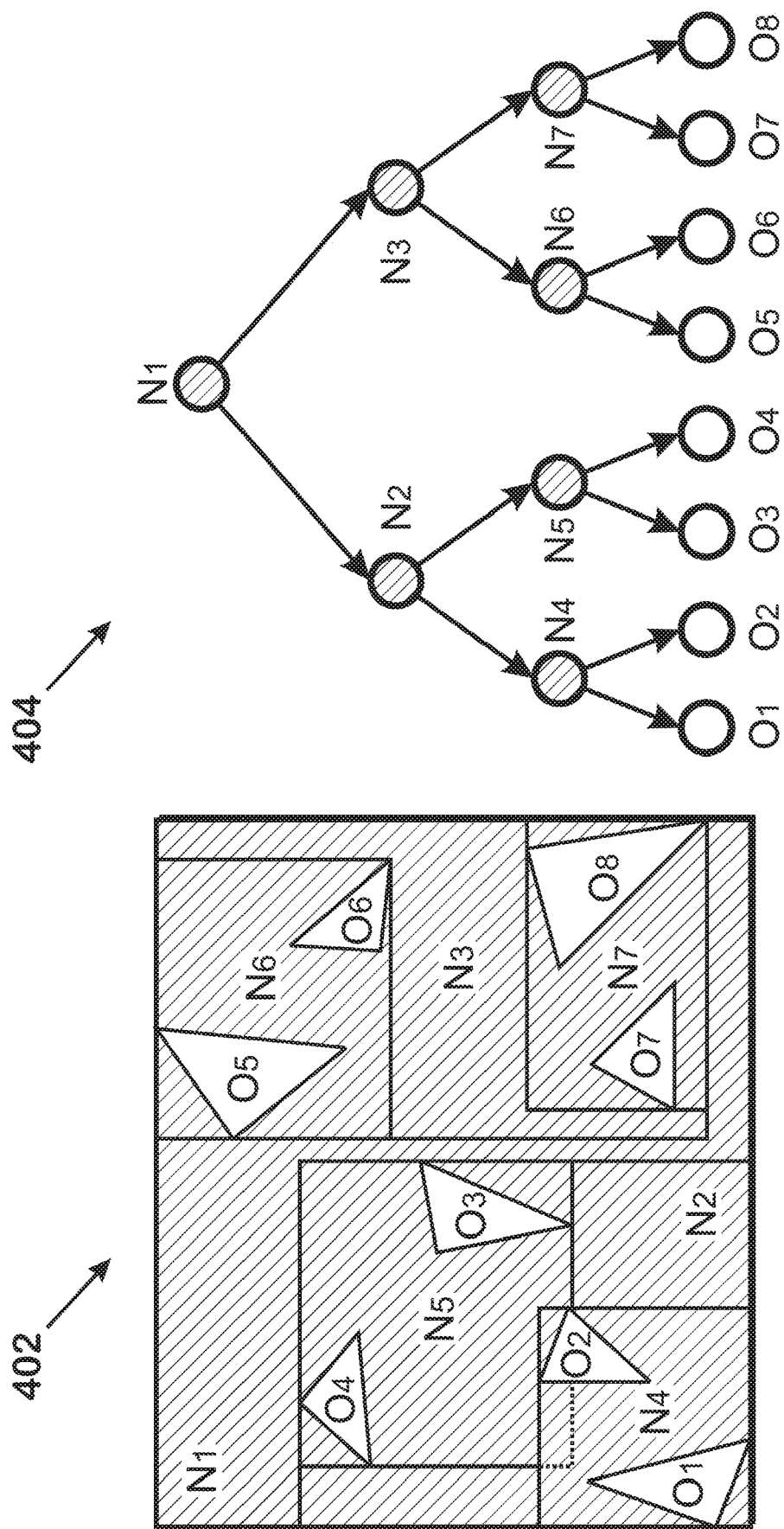
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

The ray-triangle test involves asking whether the ray hits the triangle and also the time to hit the triangle (time from ray origin to point of intersection). Conceptually, the ray-triangle test involves projecting the triangle into the viewspace of the ray so that it is possible to perform a simpler test similar to testing for coverage in two dimensional rasterization of a triangle as is commonly performed in graphics processing pipelines. More specifically, projecting the triangle into the viewspace of the ray transforms the coordinate system so that the ray points downwards in the z direction and the x and y components of the ray are 0 (although in some modifications, the ray may point upwards in the z direction, or in the positive or negative x or y directions, with the components in the other two axes being zero). The vertices of the triangle are transformed into this coordinate system. Such a transform allows the test for intersection to be made by simply asking whether the x, y coordinates of the ray fall within the triangle defined by the x, y coordinates of the vertices of the triangle, which is the rasterization operation described above.

Figure 5:
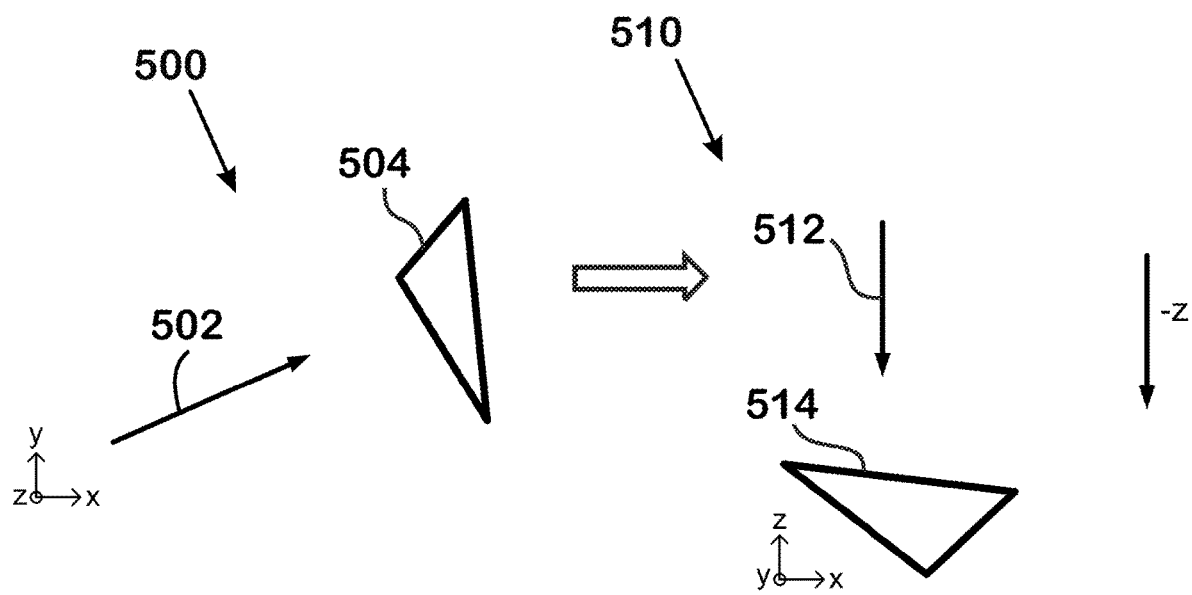
FIG. 5 illustrates a coordinate transform for performing a ray-triangle intersection test, according to an example.

This transformation is illustrated in FIG. 5. The ray 502 and triangle 504 are shown in coordinate system 500 before the transformation. In the transformed coordinate system 510 coordinate system, the ray 512 is shown pointing in the —z direction and the triangle 514 is shown in that coordinate system 510 as well.

Figure 6:
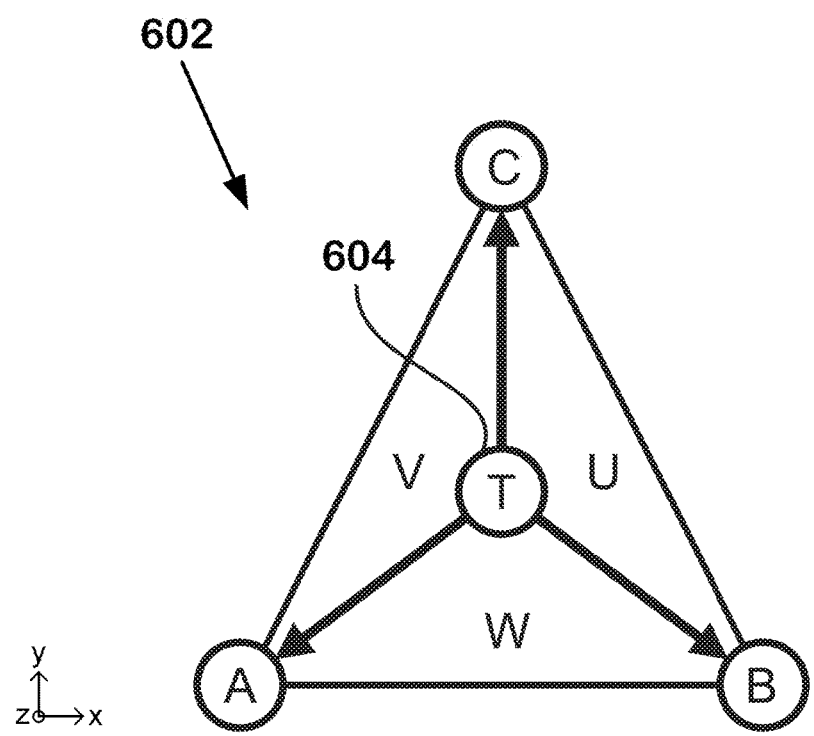
FIG. 6 illustrates the ray-triangle intersection test as a rasterization operation, according to an example.

FIG. 6 illustrates the ray intersection test as a rasterization operation. Specifically, vertices A, B, and C define the triangle 514 and vertex T is the origin of the ray 512. Testing for whether the ray 512 intersects the triangle 514 is performed by testing whether vertex T is within triangle ABC. This will be described in further detail below.

Additional details of the ray-triangle test are now provided. First, the coordinate system is rotated so that the z-axis is the dominant axis of the ray (where "dominant axis" means the axis that the ray travels the quickest in). This rotation is done to avoid some edge cases when the z component of the ray direction is 0 and the poorer numerical stability that occurs when the z component of the ray direction is small. The coordinate system rotation is performed in the following manner:

```
int kz = 0;
float largest_dim = fabs(ray_dir.x);
if (largest_dim<fabs(ray_dir.y)){
   kz=1;
   largest_dim = fabs(ray_dir.y);
}
if (largest_dim<fabs(ray_dir.z)){
   kz=2;
   largest_dim = fabs(ray_dir.z);
}
if(kz ==2){
   ray_dir=ray_dir;
   ray_origin = ray_origin;
   v0 = v0;
   v1 = v1;
   v2 = v2;
}else if(kz==1){
   ray_dir =ray_dir.zxy;
   ray_origin = ray_origin.zxy;
   v0 = v0.zxy;
   v1 = v1.zxy;
   v2 = v2.zxy;
}else{
   ray_dir=ray_dir.yzx;
   ray_origin = ray_origin.yzx;
   v0= v0.yzx;
   v1= v1.yzx;
   v2= v2.yzx;
}
```

Here, kz is a helper variable used to determine which way to rotate the axes, largest_dim is the largest dimension of the ray, ray_dir is a float3 defining the ray direction, ray_origin is a float3 defining the ray origin, v0, v1, v2 are float3's defining the vertices of the triangle, and fabs() is the floating point absolute value function. Appending .zxy or .yzx to a float3 rotates the float3. .zxy causes the new x component to be the old z component, the new y component to be the new x component, and the new z component to be the old z component. .yzx causes the new x component to be the old y component, the new y component to be the old z component, and the new z component to be the old x component. The above pseudo-code determines which component of the ray_direction vector has the largest absolute value. If the z component is the largest, kz is set to 2, and no rotation is performed. If the y component is the largest, kz is set to 1 and the ray and vertices are rotated such that the z axis is the old y axis. If the x component is the largest, kz is set to 0 and the ray and vertices are rotated such that the z axis is the old x axis.

Next, the vertices are all translated to be relative to the ray origin:
float3 v0_rel=v0-ray_origin;
float3 v1_rel=v1-ray_origin;
float3 v2_rel=v2-ray_origin;

Next, to simplify the calculation of the intersection, a linear transformation is applied to the ray and the vertices of the triangle to allow the test to be performed in 2D. This linear transformation is done by multiplying each of the vertices and the ray direction by the transformation matrix M. The ray direction can be transformed like this because ray_origin is at <0,0,0>due to the above translation step. Matrix M is the following:

$$M = \begin{bmatrix} \text{ray\_dir}.z & 0.0 & -\text{ray\_dir}.x \\ 0.0 & \text{ray\_dir}.z & -\text{ray\_dir}.y \\ 0.0 & 0.0 & 1.0 \end{bmatrix}$$

The matrix multiplication occurs in the following manner:
float Ax=v0_rel.x*ray_dir.z-ray_dir.x*v0_rel.z;
float Ay=v0_rel.y*ray_dir.z-ray_dir.y*v0_rel.z;
float Az=v0_rel.z;
float Bx=v1_rel.x*ray_dir.z-ray_dir.x*v1_rel.z;
float By=v1_rel.y*ray_dir.z-ray_dir.y*v1_rel.z;
float Bz=v1_rel.z;
float Cx=v2_rel.x*ray_dir.z-ray_dir.x*v2_rel.z;
float Cy=v2_rel.y*ray_dir.z-ray_dir.y*v2_rel.z;
float Cz=v2_rel.z;

The ray direction does not need to be explicitly transformed by matrix M because matrix M is constructed such that the transformed ray direction will always be <0, 0, ray_dir.z>. This is because of the following:

$$\text{ray\_dir}.x = \text{ray\_dir}.x * \text{ray\_dir}.z - \text{ray\_dir}.z * \text{ray\_dir}.x = 0$$

$$\text{ray\_dir}.y = \text{ray\_dir}.y * \text{ray\_dir}.z - \text{ray\_dir}.z * \text{ray\_dir}.y = 0$$

$$\text{ray\_dir}.z = \text{ray\_dir}.z$$

Conceptually, the matrix M scales and shears the coordinates such that the ray direction only has a z component of magnitude ray_dir.z. With the vertices transformed in the above manner, the ray-triangle test is performed as the 2D rasterization test. FIG. 6 illustrates a triangle 602 having vertices A, B, and C. The ray 604 is shown as well (point T). Because of the transformations performed on the vertices and the ray, the ray is pointing in the —z direction. In addition, because the triangle is projected onto the coordinate system in which the ray points in the —z direction, the triangle-ray test is reformulated as a test for whether the origin of the ray is within the triangle defined by the x, y coordinates of the vertices A, B, and C. In addition, because of the above transformations: the ray origin is at 2D point (0,0); the point of intersection between the ray and the triangle (T) is also at 2D point (0,0); and the distances between the vertices of the triangle, which are A-T for vertex A, B-T for vertex B, and C-T for vertex C, are simply A, B, and C because the point of intersection between the ray and the triangle is at (0,0).

Next, barycentric coordinates for the triangle, U, V, W (shown in FIG. 6) are calculated in the following manner:

U=area(Triangle CBT)=0.5*(C x B)

V=area(Triangle ACT)=0.5*(A x C)

W 32 area(Triangle BAT)=0.5*(B x A)

This calculation is simplified to the following:
float U=Cx*By- Cy*Bx;
float V=Ax*Cy- Ay*Cx;
float W=Bx*Ay- By*Ax;
where division is not utilized because the division by 2 is canceled out in the final result.

The signs of U, V, and W indicate whether the ray intersects the triangle. More specifically, if U, V, and W are all positive, or if U, V, and W are all negative, then the ray is considered to intersect the triangle because the point T is inside the triangle in FIG. 6. If the signs of U, V, and W are different, then the ray does not intersect the triangle because the point T is outside of the triangle in FIG. 6. If exactly one of U, V, and W is zero, then the point T lies on the line that runs through the edge corresponding to that coordinate. In this situation, the point T is on an edge of the triangle 602 if the signs of the other two coordinates are the same, but if the signs of the other two coordinates are different, then the point is not on an edge of the triangle. If exactly two of U, V, and W are zero, then the point T is considered to be on a corner of the triangle. If all of U, V, and W are zero, then the triangle is a zero area triangle. One additional point is that point T may be inside the triangle in 2D (indicated as the ray intersecting the triangle above) but may still miss the triangle in 3D space if the ray is behind the triangle. The sign of t, described below, indicates whether the ray is behind (and thus does not intersect) the triangle. Specifically, if the sign is negative, the ray is behind the triangle and does not intersect the triangle. If the sign is positive or 0, then the ray intersects the triangle.

In various implementations, any of the situations where the point is on an edge or a corner, or in the situation where the triangle is a zero area triangle, may be considered either a hit or a miss. In other words, the determination of whether the point lying on an edge is a hit or a miss, and/or the determination of whether the point lying on a corner is a hit or a miss, is dependent on a specific policy. For example, in some implementations, all instances where the point lies on an edge or a corner are considered to be hits. In other implementations, all such instances are considered to be misses. In yet other implementations, some such instances (such as the point T lying on edges facing in specific directions) are considered hits while other such instances are considered misses.

In addition, the time t at which the ray hits the triangle is determined. This is done using the barycentric coordinates of the triangle (U, V, and W) already calculated, by interpolating the Z value of all of the triangle vertices. First, the z component of point T (the intersection point of the ray with the triangle) is calculated:

$$T.z = \frac{U*Az + V*Bz + W*Cz}{U + V + W}$$

where Az is the z component of vector A, Bz is the z component of vector B, Cz is the z component of vector C, and U, V, and W are the barycentric coordinates calculated above. T.x and T.y are zero, and thus T is (0, 0, T.z). The time t is calculated as follows:

$$t = \frac{\text{distance}(\text{ray\_origin}, T)}{\text{length}(\text{ray\_dir})} = \frac{\text{length}(T)}{\text{length}(\text{ray\_dir})} = \frac{T.z}{\text{ray\_dir}.z}$$

where distance( ) represents the distance between two points, length( ) represents the length of a vector. The final expression for time of intersection t is as follows:

$$t = \frac{U*Az + V*Bz + W*Cz}{(U + V + W)*\text{ray\_dir}.z}$$

As described above, the signs of the barycentric coordinates U, V, and W are used, in combination with the sign of t to determine whether the ray hits the triangle. Specifically, the ray intersection unit 139 determines that the ray hits the triangle if the signs of U, V, and W are all positive or all negative and the sign of t is positive or 0. If the signs of any two of the barycentric coordinates are different, then the ray does not hit the triangle. If the signs of two barycentric coordinates are the same, the sign of t is positive, and the sign of the other barycentric coordinate is 0, then the ray intersects an edge of the triangle. If the signs of two (but not three) barycentric coordinates are zero, then the ray intersects a corner of the triangle. In either the situation that the ray intersects an edge of the triangle or a corner of the triangle, it is ambiguous as to whether to consider the ray to have hit the triangle. Moreover, it is important to handle these cases correctly, since incorrect handling of these cases can result in holes, or, conversely, can result in triangle edges being colored too darkly, where triangles whose edges border each other are involved. Specifically, if an intersection of a ray with an edge were always considered a miss, then the edge of two bordering triangles would appear as a hole. If an intersection exactly on an edge were always considered a hit, then the edges of bordering triangles could be colored too darkly, for instance, where both triangles have partial transparency and thus both hits contribute to the color of a pixel. To avoid the above situations, the ray intersection unit 139 utilizes a tie breaking scheme to assign edge hits evenly among bordering triangles, such that when a ray intersects an edge shared by two triangles on opposite sides of the edge, one triangle, but not both triangles, will consider that intersection a hit, and when a ray intersects a corner shared by two or more triangles, one triangle, but not multiple triangles, will consider that intersection a hit. This tie breaking scheme is now described.

Figure 7:
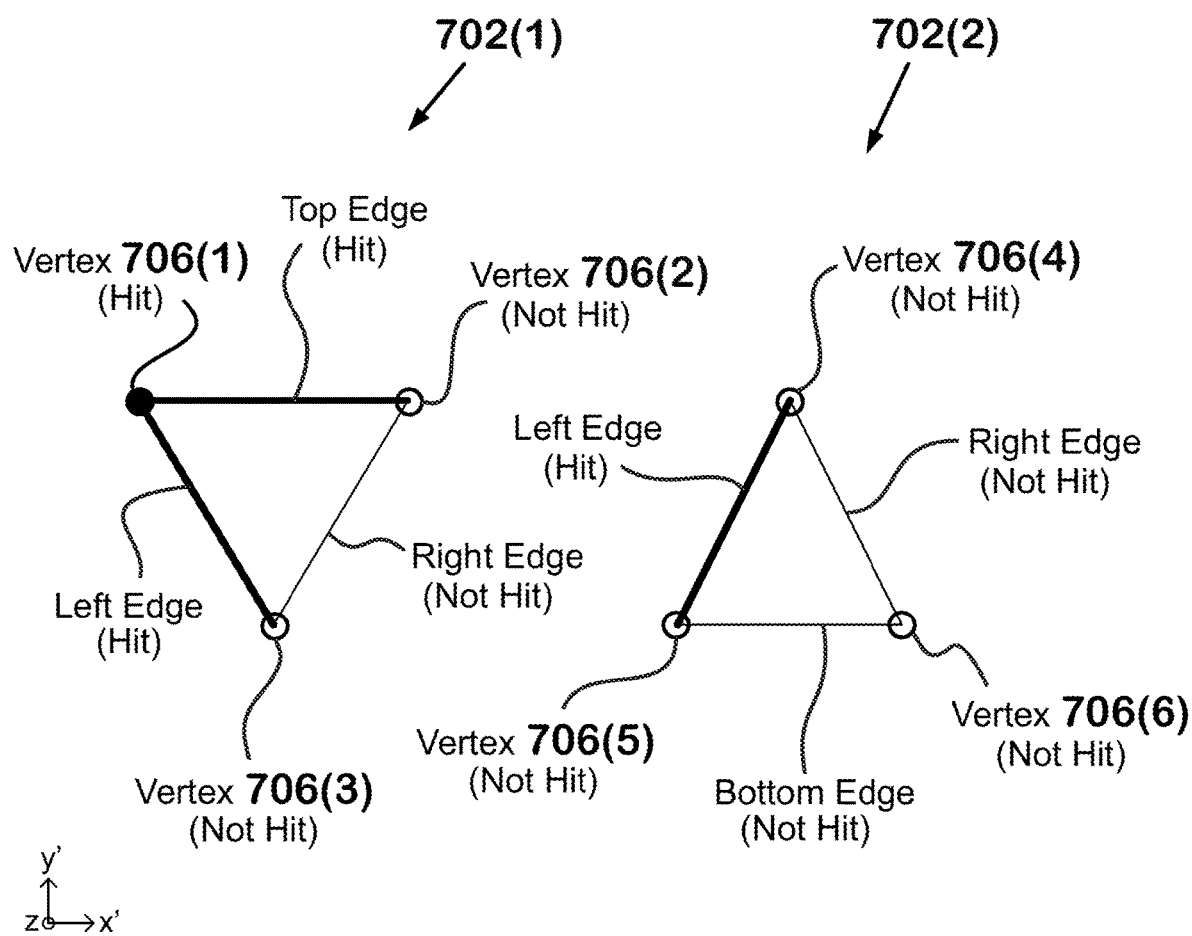
FIG. 7 illustrates two triangles to which a tie breaking scheme is applied, according to an example.

FIG. 7 illustrates two triangles 702 to which a tie breaking scheme is applied, according to an example. As described above, in the situation where one (but not two or three) of the barycentric coordinates equals zero, the ray is determined to intersect the edge of the triangle. In this situation, the tie breaking scheme is invoked to determine whether to classify the intersection as a hit or a miss. The tie breaking scheme involves classifying the intersected edge as one of a left edge, a right edge, a top edge, or a bottom edge. Then, the tie breaking scheme involves classifying the intersection as a hit based on whether the intersected edge is a left edge, a top edge, a right edge or a bottom edge.

One specific mapping between edge classification and hit/miss classification is now described. However, it should be understood that this mapping is an example and that alternate mappings are possible. In the example mapping, intersections with left edges and top edges are classified as hits, and intersections with right edges and bottom edges are classified as misses. This mapping allows an edge shared between two triangles to be classified as a hit for only one of the triangles. For example, an edge that is a top edge for one triangle, and is thus classified as a hit, is necessarily a bottom edge for a triangle adjacent to that edge, and is thus classified as a miss for that triangle. Similarly, an edge that is a left edge for one triangle, and is thus classified as a hit for that triangle, is necessarily a right edge for a triangle adjacent to that edge, and is thus classified as a miss for that adjacent triangle.

The coordinate system in which the determination of how to classify edges is made is shown in FIG. 7 as a coordinate system having perpendicular x', y', and z axes, where the "left" direction is the direction of −x', the "right" direction is the direction of +x', the "top" direction is the direction of +y', and the "bottom" direction is the direction of −y'. In some implementations, x', y', and z are the same axes as those that are present in the coordinate system after the scale and shear transformation described above (the coordinate system that exists after multiplication of the triangle's vertices by matrix M). In other implementations, the coordinate system of x', y', and z is rotated around the z axis as compared with the coordinate system after the scale and shear transformation described above. For example, x' may be the positive y direction of that coordinate system, with y' being the −x direction of that coordinate system. In other examples, x' is rotated by positive 30 degrees from the x axis of that coordinate system. The degree of rotation does not matter, as long as the same degree of rotation is applied for all triangles to obtain consistent tie breaking results (i.e., as long as the coordinate space x', y', and z is the same for all triangles). In other examples, the coordinate system of x', y', and z is both rotated and mirrored with respect to the coordinate system after the multiplication by matrix M. With the above classification, only triangles on one side of an edge will classify a hit for a ray that intersects that edge, which results in the benefit that no holes will occur, but also that too many hits are not registered.

The term "left" refers to any edge whose outward facing normal (away from the triangle) has a negative x' component. The term "right" refers to any edge whose outward facing normal has a positive x' component. The term "top" refers to any edge that is exactly horizontal and is above (has a greater y coordinate than) the vertex that does not comprise that edge. The term "bottom" refers to any edge that is exactly horizontal and is below the vertex that does not comprise that edge.

In FIG. 7, triangle 702(1) has a top edge, which is exactly horizontal and is at the top of the triangle. This edge is classified as a hit. The triangle also has a left edge which is classified as a hit and a right edge which is classified as not hit. Triangle 702(2) has a bottom edge, which is classified as not hit, a left edge, which is classified as hit, and a right edge, which is classified as not hit.

In addition to applying tie breaking for edges, the ray intersection unit 139 also applies tie breaking for vertices, again, to ensure that vertices do not result in holes or result in too many hits being detected. The rule for vertices is that for a ray that intersects a vertex, that intersection is classified as a hit if the two bordering edges of that vertex are either top or left edges. A ray that intersects a vertex is not classified as a hit if at least one of the edges that borders the vertex is a bottom edge or a right edge.

In FIG. 7, a ray intersecting vertex 706(1) is classified as a hit because that vertex borders both a top edge and a left edge. A ray intersecting vertex 706(2) is not classified as a hit because that vertex borders a right edge. Similarly, a ray intersecting vertex 706(3) is not classified as a hit because that vertex borders a right edge. In the triangle 702(2), none of the vertices (706(4), 706(5), and 706(6)) are classified as hits because each of those vertices border at least one right edge or one bottom edge.

Note that a specific mapping of edge classification to hit classification is described. However, other mappings are possible as well and fall within the scope of the present disclosure. Such other mappings may be rotations and/or mirror-images of the mapping described herein. For example, instead of left and top edges being classified as hits, right and top edges are classified as hits, with bottom and left edges being classified as misses. It is also possible to use a mapping for which right and left edges are defined as exactly vertical edges, with top and bottom edges being defined as those whose outward facing normals have positive and negative y components, respectively. While many such mappings are possible, each has the property that rays that intersect edges will be classified as hits for triangles on one side of an edge but not the other. In addition, it is possible for vertices to be classified as hits or misses in a way other than that described. In various examples, vertices that border bottom and/or left edges are classified as hits, with vertices that border at least one top or one right edge being classified as misses. In other examples, vertices that border bottom and/or right edges are classified as hits, with vertices that border at least one left edge or one top edge being classified as misses. In yet other examples, vertices that border right and/or top edges are classified as hits, with vertices that border at least one left edge or one bottom edge being classified as misses. As with edges, the manner in which the edges are classified may vary, although the manner should be consistent for both edge and vertex classification. As with for edges, while many mappings are possible for vertex classification, each mapping should have the property that a ray intersecting a vertex should be classified as a hit for only one triangle out of multiple triangles that share that vertex.

A hardware-implementable technique for making a determination as to whether a ray that intersects an edge or a vertex is to be classified as a hit or a miss is now provided. In some implementations, this technique is performed by the ray intersection unit 139 of FIG. 2. This technique is efficient in that the technique uses many of the values that were calculated in determining the barycentric coordinates and t_num and t_denom, described above. The technique is described in pseudo-code as follows:

```
bool winding_order = t_denom>0.;
if(fabs(U)==0.0){
    bool exact_horz = (fabs(By)==0. && fabs(Cy)==0.0);
    if(exact_horz){
        bool bottom_edge = Ay>0.;
        triangle_missed |= bottom_edge;
    }else{
        bool first_vertex_below_second =
By<0.||(fabs(By)==0.&&Cy>0.);
        bool right_edge =
first_vertex_below_second^winding_order;
        triangle_missed |=right_edge;
    }
```

```
    }
    if(fabs(V)==0.0){
        bool exact_horz = (fabs(Cy)==0. && fabs(Ay)==0.0);
        if(exact_horz){
            bool bottom_edge = By>0.;
            triangle_missed |= bottom_edge;
        }else{
            bool first_vertex_below_second =
Cy<0.||(fabs(Cy)==0.&&Ay>0.);
            bool right_edge =
first_vertex_below_second^winding_order;
            triangle_missed |=right_edge;
        }
    }
    if(fabs(W)==0.0){
        bool exact_horz = (fabs(Ay)==0. && fabs(By)==0.0);
        if(exact_horz){
            bool bottom_edge = Cy>0.;
            triangle_missed |= bottom_edge;
        }else{
            bool first_vertex_below_second =
Ay<0.||(fabs(Ay)==0.&&By>0.);
            bool right_edge =
first_vertex_below_second^winding_order
            triangle_missed |=right_edge;
        }
    }
```

This technique includes determining whether the edge corresponding to each of the barycentric coordinates is intersected by the ray (by determining whether that barycentric coordinate is equal to 0), and if so, performing tie breaking for that intersection. It should be understood that this technique is an example hardware implementation of the more general technique described elsewhere herein and that various modifications to the technique are possible.

According to the technique, a boolean value is set based on the winding order of the triangle. Each triangle input to the ray intersection test has a winding order of counterclockwise. This winding order means that vertices A, B, and C are arrayed around the triangle in a counterclockwise manner, as in the example shown in FIG. 6. However, the ray may intersect either the front face or the back face of the triangle. If the ray intersects the front face of the triangle, then the winding order from the perspective of the ray is counterclockwise. If the ray intersects the back face of the triangle, then winding order from the perspective of the ray is clockwise. The determination of whether the ray intersects the front or back face is made by examining the sign of the denominator of t, which works because (U+V+W)*ray_dir.z is equivalent to dot(cross(A,C), ray_dir) (where "dot" is the dot product and "cross" is the cross product), which is the equation that is used to determine which side of a triangle a ray hit.

After determining the winding order, the technique examines each of the barycentric coordinates to determine whether those barycentric coordinates are equal to zero. Although a specific order is illustrated (U then V then W), any technically feasible order is possible. If U is equal to zero, then a test corresponding to the associated edge (edge B-C in FIG. 6) is performed. In this test, it is determined whether the associated edge is exactly horizontal by determining whether the y values are equal to zero for both vertices that constitute that edge. If the edge is exactly horizontal, then the edge is either top or bottom. The edge is a bottom edge if the y value of the vertex that does not constitute the edge is greater than 0. This is so because due to the translation of all coordinates to be relative to the ray origin, the x and y values of the ray (point T in FIG. 6) are (0,0). Thus if the edge corresponding to U is horizontal and has a y coordinate of 0, the vertex not corresponding to that edge must be either above or below the line of y=0. If that vertex is above y=0, then the edge is a bottom edge. If the vertex is below y=0, then the edge is a top edge. If the edge is a bottom edge, then a boolean value triangle_missed (which is initialized to false, not shown), is set to true, since the intersection can only be an intersection of a bottom edge or of a vertex that borders a bottom edge, neither of which is classified as a hit.

If, instead of being exactly horizontal, the edge corresponding to coordinate U is not exactly horizontal, then the edge is either a left edge or a right edge by definition. If the edge is a right edge, then the intersection is classified as a miss. This classification is because the intersection is either on a right edge, which results in a miss, or is on a vertex that borders a right edge, which also results in a miss (since vertices must border only either top or left edges to be classified as hits). Determining whether the edge corresponding to U is a right edge occurs in the following manner. First, it is determined whether the "first" vertex is below the "second" vertex. By definition, vertex A is "lower order" than vertex B, which is "lower order" than vertex C, which is "lower order" than vertex A. One vertex is the "first" vertex if that vertex is a lower order than another vertex (which is thus the "second" vertex). Thus B is the first vertex and C is the second vertex. If the first vertex for U, B, has a y coordinate of less than zero, then the first vertex must be below the second vertex, C, because the point corresponding to the ray passes through the origin, which has y value of zero. In this instance, the first vertex, B is below the second vertex C. This case is logically ORed with the case where vertex B has a y value equal to zero, logically ANDed with the y value of vertex C being above zero. If B has a y value of zero, then the intersection occurs on vertex B. Thus the first vertex, B, is below the second vertex, C, if the y value of C is above zero. (Because if the y value of C is below zero, then B is above C and the previous code path already checked whether the y values of B and C are equal). If the winding order is counterclockwise, then if the first vertex is below the second vertex, then the edge is considered a right edge. If the winding order is clockwise, then the opposite is true because that means the order of the first and second edge are reversed. Thus the boolean first_vertex_below_second is bitwise XORed with the winding order. Finally, the triangle_missed boolean is set to true if the coordinate U is on a right edge.

The above operations are repeated for both the V and the W coordinates. The result is that, for whichever edge the ray intersects (i.e., that corresponding to coordinate U, V, or W), if that edge is a right edge or a bottom edge, the intersection is classified as a miss, and is classified as a hit otherwise. Note that in the case where the intersection is on a vertex, two of the three paths where a barycentric coordinate equals zero will be performed. This facilitates a test for whether the vertex is one that borders either of both left edges or a left and a top edge by setting triangle_missed to true if either of the edges that corresponding to the intersection is a right edge or a bottom edge. If neither of those edges are a right edge or a bottom edge, then the vertex must border both left edges or either a left edge and a top edge and triangle_missed is never set to true.

Figure 8:
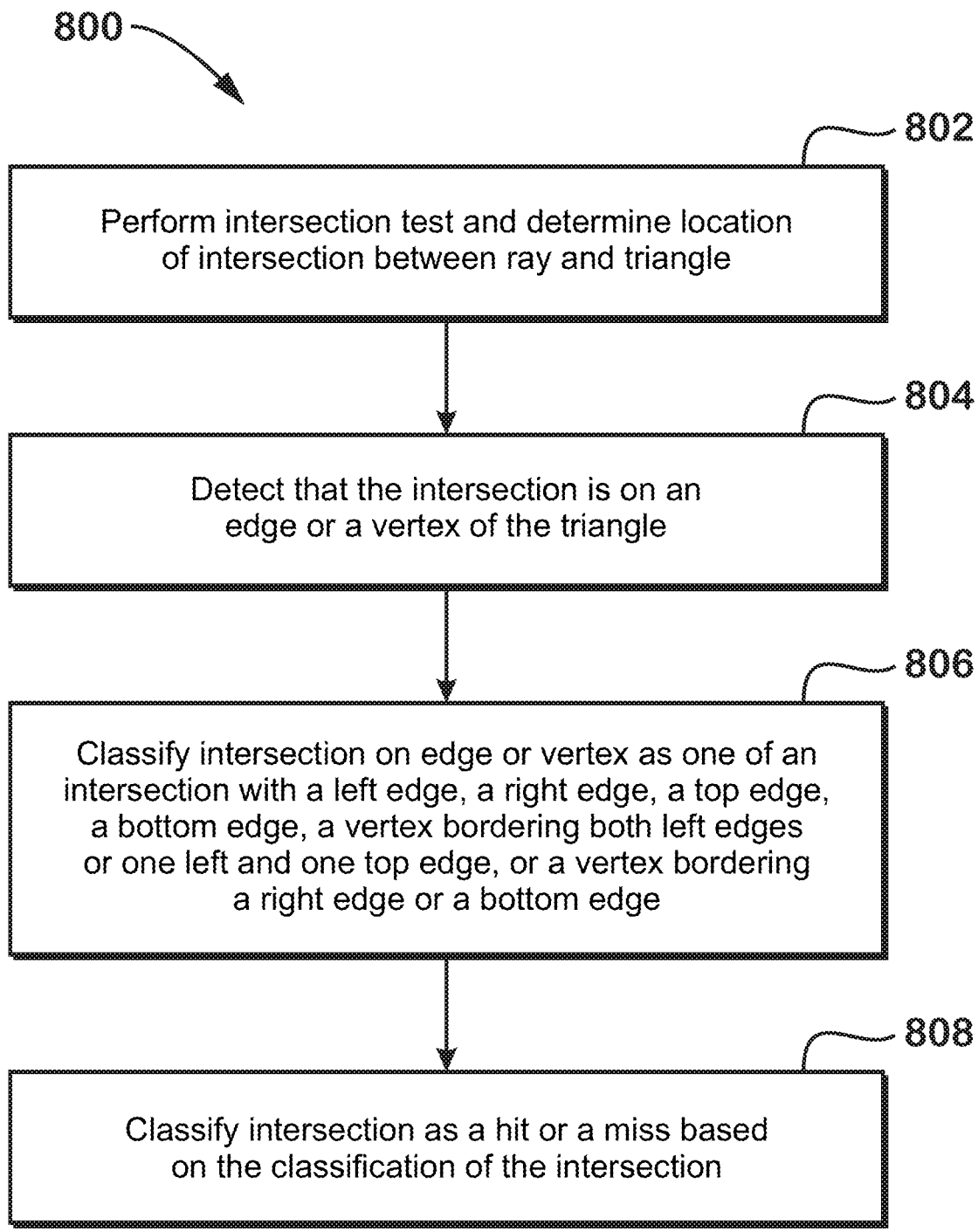
FIG. 8 is a flow diagram of a method for performing a tiebreaking technique to classify ray-triangle intersections that intersect edges or vertices of the triangle as hits or misses, according to an example.

FIG. 8 is a flow diagram of a method 800 for performing a tiebreaking technique to classify ray-triangle intersections that intersect edges or vertices of the triangle as hits or misses, according to an example. Although described with respect to the system of FIGS. 1-7, it should be understood that any system, configured to perform the steps of the method 800 in any technically feasible order, falls within the scope of the present disclosure.

The method 800 begins at step 802, where the ray intersection unit 139 performs an intersection test to determine the location of an intersection between a ray and a triangle. Although one technique for determining the location of an intersection is described herein (i.e., the calculations related to determining barycentric coordinates of an intersection and the time to intersection, where "location of intersection" is defined by the barycentric coordinates U, V, and W), the intersection test may be any technically feasible test to detect intersection between a ray and a triangle.

At step 804, the ray intersection unit 139 detects that the intersection is on an edge or a vertex of the triangle. According to the technique provided herein, this testing is done by testing for whether one or more of the barycentric coordinates U, V, and W is equal to 0, although any technically feasible test may alternatively be used.

At step 806, the ray intersection unit 139 classifies the intersection as an intersection with one of a left edge, a right edge, a top edge, a bottom edge, a vertex bordering both left edges or one left and one top edge, or a vertex bordering a right edge or a bottom edge. As described elsewhere herein, a top edge and a bottom edge are both exactly horizontal edges. A top edge is at the top of the triangle and a bottom edge is at the bottom of the triangle. A left edge is an edge whose outward facing normal faces left (the negative x direction) and a right edge is an edge whose outward facing normal faces right (the positive x direction). Although this particular definition of top, bottom, left, and right is provided, it should be understood that various modifications to this definition are possible. In one example, left and right edges are exactly vertical and top and bottom edges are those with outward facing normals facing upwards and downwards, respectively. Other ways to classify edges are of course possible.

At step 808, the ray intersection unit 139 classifies the intersection as a hit or a miss based on the classification of the intersection in step 806. Generally, this classification is done so that for triangles that border the same edge, a ray intersection with that edge only counts as a hit for triangles on one side of the edge. The classification is also done so that for triangles that border the same vertex, a ray intersection with that vertex only counts as a hit for one of the triangles. One technique achieving the above result is to classify intersections with edges as hits for top and left edges but as misses for bottom and right edges, and to classify intersections with vertices as hits for vertices that border two left edges or a left edge and top edge, but as misses for vertices that border at least one bottom or right edge. Other techniques are possible as well. Such techniques would use different combinations of classifications that still result in classification of intersections with edges as hits for triangles on one side but not the other side of an edge and classification of intersections with vertices as hits for only one triangle that borders the vertex. Various other such techniques are described elsewhere herein.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

* * *

What is claimed is:

1. A computing device configured to test for intersection of a ray by a triangle, the computing device comprising:
   a processor configured to generate a ray intersection test request for testing for intersection between a ray and a triangle; and
   a ray intersection test unit configured to receive the ray intersection test request and to test for intersection between the ray and a triangle, by:
      determining a location of an intersection between the ray and the triangle;
      detecting that the intersection is on one of an edge or a vertex of the triangle;
      classifying the intersection as one of an intersection with a left edge, a right edge, a top edge, a bottom edge, a vertex bordering both left edges or one left edge and one top edge, or a vertex bordering a right edge or a bottom edge; and
      based on the classifying, classifying the intersection as a hit or a miss.

2. The computing device of claim 1, wherein the intersection falls on an edge of the triangle and classifying the intersection as a hit or a miss comprises classifying the intersection according to a scheme wherein intersections on edges that border multiple triangles are classified as hits for triangles on one side of the edge but not on the other side of the edge.

3. The computing device of claim 1, wherein classifying the intersection as a hit or a miss comprises classifying the intersection according to a scheme in which intersections on left edges or top edges are classified as hits and intersections on right edges or bottom edges are classified as misses.

4. The computing device of claim 1, wherein:
   a top edge comprises an edge that is exactly horizontal and has an outward facing normal that points in a positive y direction;
   a bottom edge comprises an edge that is exactly horizontal and has an outward facing normal that points in a negative y direction;

a left edge comprises an edge that has an outward facing normal with a negative x component; and a right edge comprises an edge that has an outward facing normal with a positive x component.

5. The computing device of claim 1, wherein the intersection falls on a vertex of the triangle and classifying the intersection as a hit or a miss comprises classifying the intersection according to a scheme in which, for an intersection that falls on a vertex that is shared between triangles, the intersection is classified as a hit for only one triangle that borders the vertex.

6. The computing device of claim 1, wherein classifying the intersection as a hit or a miss comprises classifying the intersection according to a scheme in which intersections on vertices that border both left edges or a top edge and a left edge are classified as hits and intersections on vertices that border either a bottom edge or a right edge are classified as misses.

7. The computing device of claim 1, wherein determining a location of an intersection between the ray and the triangle comprises determining barycentric coordinates of a point corresponding to the ray within the triangle, in a coordinate space in which the ray direction points in the negative z direction and has no x or y components.

8. The computing device of claim 7, wherein detecting that the intersection is on an edge comprises detecting that one of the barycentric coordinates has a value of zero.

9. The computing device of claim 8, wherein detecting that the intersection is on a vertex comprises detecting that two of the barycentric coordinates have a value of zero.

10. A method for testing for intersection of a ray by a triangle, the method comprising:
in response to a ray intersection test request for testing for intersection between the ray and the triangle:
determining a location of an intersection between the ray and the triangle;
detecting that the intersection is on one of an edge or a vertex of the triangle;
classifying the intersection as one of an intersection with a left edge, a right edge, a top edge, a bottom edge, a vertex bordering both left edges or one left edge and one top edge, or a vertex bordering a right edge or a bottom edge; and
based on the classifying, classifying the intersection as a hit or a miss.

11. The method of claim 10, wherein the intersection falls on an edge of the triangle and classifying the intersection as a hit or a miss comprises classifying the intersection according to a scheme wherein intersections on edges that border multiple triangles are classified as hits for triangles on one side of the edge but not on the other side of the edge.

12. The method of claim 10, wherein classifying the intersection as a hit or a miss comprises classifying the intersection according to a scheme in which intersections on left edges or top edges are classified as hits and intersections on right edges or bottom edges are classified as misses.

13. The method of claim 10, wherein:
a top edge comprises an edge that is exactly horizontal and has an outward facing normal that points in a positive y direction;
a bottom edge comprises an edge that is exactly horizontal and has an outward facing normal that points in a negative y direction;
a left edge comprises an edge that has an outward facing normal with a negative x component; and
a right edge comprises an edge that has an outward facing normal with a positive x component.

14. The method of claim 10, wherein the intersection falls on a vertex of the triangle and classifying the intersection as a hit or a miss comprises classifying the intersection according to a scheme in which, for an intersection that falls on a vertex that is shared between triangles, the intersection is classified as a hit for only one triangle that borders the vertex.

15. The method of claim 10, wherein classifying the intersection as a hit or a miss comprises classifying the intersection according to a scheme in which intersections on vertices that border both left edges or a top edge and a left edge are classified as hits and intersections on vertices that border either a bottom edge or a right edge are classified as misses.

16. The method of claim 10, wherein determining a location of an intersection between the ray and the triangle comprises determining barycentric AMD-180445-US-NP coordinates of a point corresponding to the ray within the triangle, in a coordinate space in which the ray direction points in the negative z direction and has no x or y components.

17. The method of claim 16, wherein detecting that the intersection is on an edge comprises detecting that one of the barycentric coordinates has a value of zero.

18. The method of claim 17, wherein detecting that the intersection is on a vertex comprises detecting that two of the barycentric coordinates have a value of zero.

19. A ray intersection test unit configured to receive a ray intersection test request and to test for intersection between the ray and a triangle, by:
determining a location of an intersection between the ray and the triangle;
detecting that the intersection is on one of an edge or a vertex of the triangle;
classifying the intersection as one of an intersection with a left edge, a right edge, a top edge, a bottom edge, a vertex bordering both left edges or one left edge and one top edge, or a vertex bordering a right edge or a bottom edge; and
based on the classifying, classifying the intersection as a hit or a miss.

20. The ray intersection test unit of claim 19, wherein the intersection falls on an edge of the triangle and classifying the intersection as a hit or a miss comprises classifying the intersection according to a scheme wherein intersections on edges that border multiple triangles are classified as hits for triangles on one side of the edge but not on the other side of the edge.

* * * * *